(12) United States Patent
Eichhorn et al.

(10) Patent No.: US 6,478,456 B1
(45) Date of Patent: Nov. 12, 2002

(54) HEADLAMP HAVING AN IMPACT-RESISTANT HOUSING ASSEMBLY

(75) Inventors: Henning Eichhorn, Lippstadt (DE); Christian Huether, Ruethen (DE); Dirk Kersting, Lippstadt (DE); Roland Lachmayer, Bad Sassendorf (DE); Bernd Mennen, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/589,876

(22) Filed: Jun. 9, 2000

(30) Foreign Application Priority Data

Jun. 9, 1999 (DE) .......................... 199 26 346

(51) Int. Cl.[7] ............................ F21V 15/04; B60Q 1/00
(52) U.S. Cl. ...................... 362/369; 362/390; 362/496; 362/507; 362/546; 362/505; 362/506
(58) Field of Search ................ 362/496, 507, 362/546, 369, 505, 506, 390

(56) References Cited

U.S. PATENT DOCUMENTS

| | | | | |
|---|---|---|---|---|
| 3,757,109 A | * | 9/1973 | Knecht et al. ............. 240/90 |
| 4,213,644 A | * | 7/1980 | Scrivo et al. ............. 293/117 |
| 4,270,787 A | * | 6/1981 | Savell ..................... 293/121 |
| 4,387,920 A | * | 6/1983 | Slaughter et al. .......... 293/117 |
| 4,422,136 A | | 12/1983 | Newman et al. |
| 4,466,646 A | * | 8/1984 | Delmastro et al. ......... 293/117 |
| 4,731,707 A | * | 3/1988 | McMahan et al. .......... 362/66 |
| 4,758,034 A | * | 7/1988 | Ghezzi et al. ............. 293/132 |
| 4,965,703 A | * | 10/1990 | Whalen .................... 362/61 |
| 4,996,634 A | * | 2/1991 | Haneda et al. ............. 362/82 |
| 6,190,030 B1 | * | 2/2001 | Chase ....................... 362/549 |

FOREIGN PATENT DOCUMENTS

DE    A1-19732301    2/1998

* cited by examiner

Primary Examiner—Thomas M. Sember
Assistant Examiner—Jacob Y. Choi
(74) Attorney, Agent, or Firm—Birch, Stewart, Kolasch & Birch, LLP

(57) ABSTRACT

Headlamp, in particular for motor vehicles, with a headlamp housing that can be inserted into a housing receiver from the front, whereby—in the event of a defined impact in a longitudinal direction that exceeds a specific force opposite to the driving direction—the headlamp housing is displaced within the housing receiver a predetermined energy-absorption path.

17 Claims, 4 Drawing Sheets

HEADLAMP HAVING AN IMPACT-RESISTANT HOUSING ASSEMBLY

BACKGROUND OF THE INVENTION

This application claims a priority based on German application 199 26 346.9 filed on Jun. 9, 1999, and the disclosure in that German priority application is incorporated by reference herein.

This invention relates to a headlamp, in particular for motor vehicles, which has a headlamp housing that can be inserted into an opening in a vehicle body from a front, relative to a driving direction.

For pedestrian safety as it relates to automobiles, it is important in crash situations to conform to biomechanical limit values for specific parts of the human body when there is a collision. This also applies to an area of the headlamps which is subjected to loading primarily in the driving direction.

DE 197 32 301 A1 discloses a headlamp for a motor vehicle which has a headlamp housing that has at least one lamp device and which can be inserted into a housing receiver from a front relative to a driving direction. The housing receiver part is structured-as an energy absorbing deformation part to absorb impact energy that is transmitted primarily in the vehicle's longitudinal direction. The housing receiver part of this known headlamp is structured as a deformation part in the form of a cylindrical cavity, on whose inner wall are welded two U-shaped energy absorbing elements, located across from one another and extending in the vehicle's longitudinal direction, which serve simultaneously as guides for a headlamp housing on which pins are arranged for insertion into these guides.

Disadvantageous on the known headlamp is that the entire housing receiver is designed as an energy absorbing deformation part that absorbs impact energy transmitted in the vehicle's longitudinal direction. This leads to a situation in which it is either very difficult to meet biomechanical limit values or to achieve adequate stability of the housing.

Therefore, it is an object of this invention to improve a known headlamp so that in collisions with pedestrians, prescribed biomechanical values for corresponding parts of the human body can be conformed to even with a high degree of stability of the headlamp.

SUMMARY OF THE INVENTION

According to principles of this invention, a headlamp housing of a headlamp, which is insertable into a vehicle body opening from a front relative to a driving direction, can be displaced along a predetermined energy-absorption path when an impact force occurs that effectively acts from the front in a direction at an acute angle to the longitudinal axis of the headlamp housing.

The housing receiver can have a generally sufficient stability because the headlamp housing can be displaced along the predetermined energy-absorption path. Favorable biomechanical limit values can be achieved through design of the predetermined energy-absorption path.

In a preferred embodiment of the invention the headlamp housing is enclosed in a receiver cavity of an energy absorbing block, whereby a backside and/or several sidewalls of the headlamp housing have direct surface contact with walls defining the receiver cavity. In this way an impact force can be captured from any direction from the front and can be suitably absorbed. In this case the headlamp housing can be displaced in a direction of impact force or the energy absorbing block can have regions of different stiffness such that the headlamp housing is guided in a prescribed direction within an opening in the vehicle body. Another advantage of the construction of an energy absorbing block that encloses or captures the headlamp housing is that this block has a supportive function for the headlamp housing, so that assembly related costs can be reduced. The number of attachment points of the headlamp housing can thereby be reduced or limited to specific areas.

According to a preferred embodiment of the invention the headlamp housing has guide parts which can be latched into guides of a housing receiver in a normal position. The guide parts are structured as pins, or lugs, which have a predetermined breaking point so that they shear off when a defined impact occurs and unlatch the headlamp housing within the housing receiver.

It can be assured that energy absorption displacement will be enabled in the event of a defined impact, in that the guide parts are structured as pins which have the predetermined breaking point.

According to a further preferred embodiment of the invention, a rear side of the headlamp housing, facing away from a light-transmissive protective cover, after freeing, can be pushed along the energy-absorption path against an energy absorber.

Because the rear side of the headlamp housing can be pushed against, or impacts with, an energy absorber, a precise predictable energy absorption is possible.

According to another preferred embodiment of the invention at least one sidewall of the headlamp housing is supported, via an energy absorber and a stationary holding part, preferably a housing receiver, which is rigidly attached to a vehicle body part so that when an impact occurs from the front a defined energy absorption path can be structured in a lateral direction.

According to another preferred embodiment of the invention the energy absorber is structured as a foam absorber including a compressible foam.

A displacement of the headlamp housing within the headlamp receiver activates the foam absorber which absorbs the greater portion of the transmitted energy. Besides compressible foam, however, other energy absorbing systems are also possible.

According to another preferred embodiment of the invention the headlamp housing has an elastic gasket against the housing receiver. Firstly, the elastic gasket seals the headlamp housing, which is open toward the rear, relative to the headlamp receiver, and secondly, to a certain extent, the elastic gasket acts as energy storage.

Nevertheless, most of the energy conversion occurs as plastic deformation of the energy absorber.

According to another preferred embodiment of the invention the headlamp housing has—on its backside—a first contact element that can be conductively connected to a second contact element seated on the housing receiver. The second contact element detaches from its seat when a defined impact occurs, and it can be displaced together with the headlamp housing along the energyabsorption path.

Damage to the contact element is prevented in that the second contact element also detaches from its seat when a defined impact occurs, and displaces along the energy-absorption path.

According to another preferred embodiment of the invention the second contact element is seated in a clip mount mounted on the housing receiver. Firstly, the clip mount permits easy assembly of the second contact element and secondly it allows the contact element to detach from its seat without damage.

According to another preferred embodiment of the invention the pins, or lugs, and the energy absorber are structured so that they are replaceable.

Replaceability of the pins and energy absorber permits trouble free repair after a crash involving the headlamps.

BRIEF DESCRIPTION OF THE DRAWINGS

The invention is explained below by concrete examples of its implementation and supplied figures. The described and drawn features can be used, individually or in preferred combinations, in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
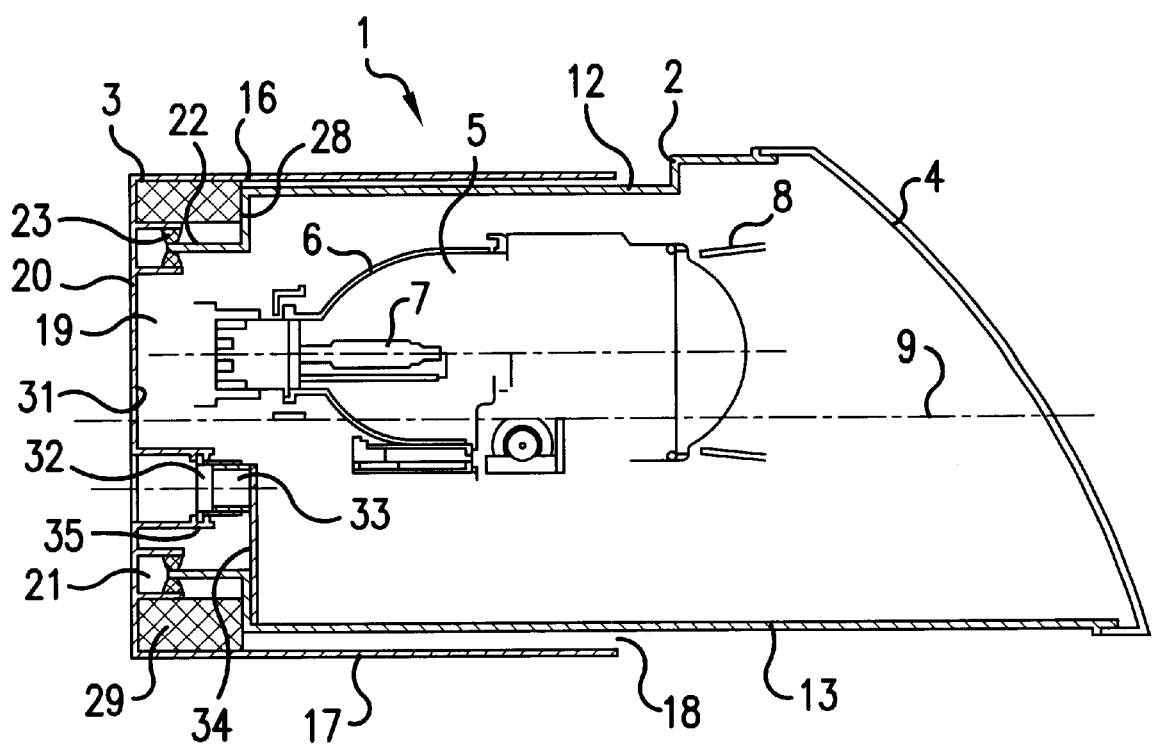
FIG. 1 is a side sectional view of a headlamp of this invention for motor vehicles.
Figure 2:
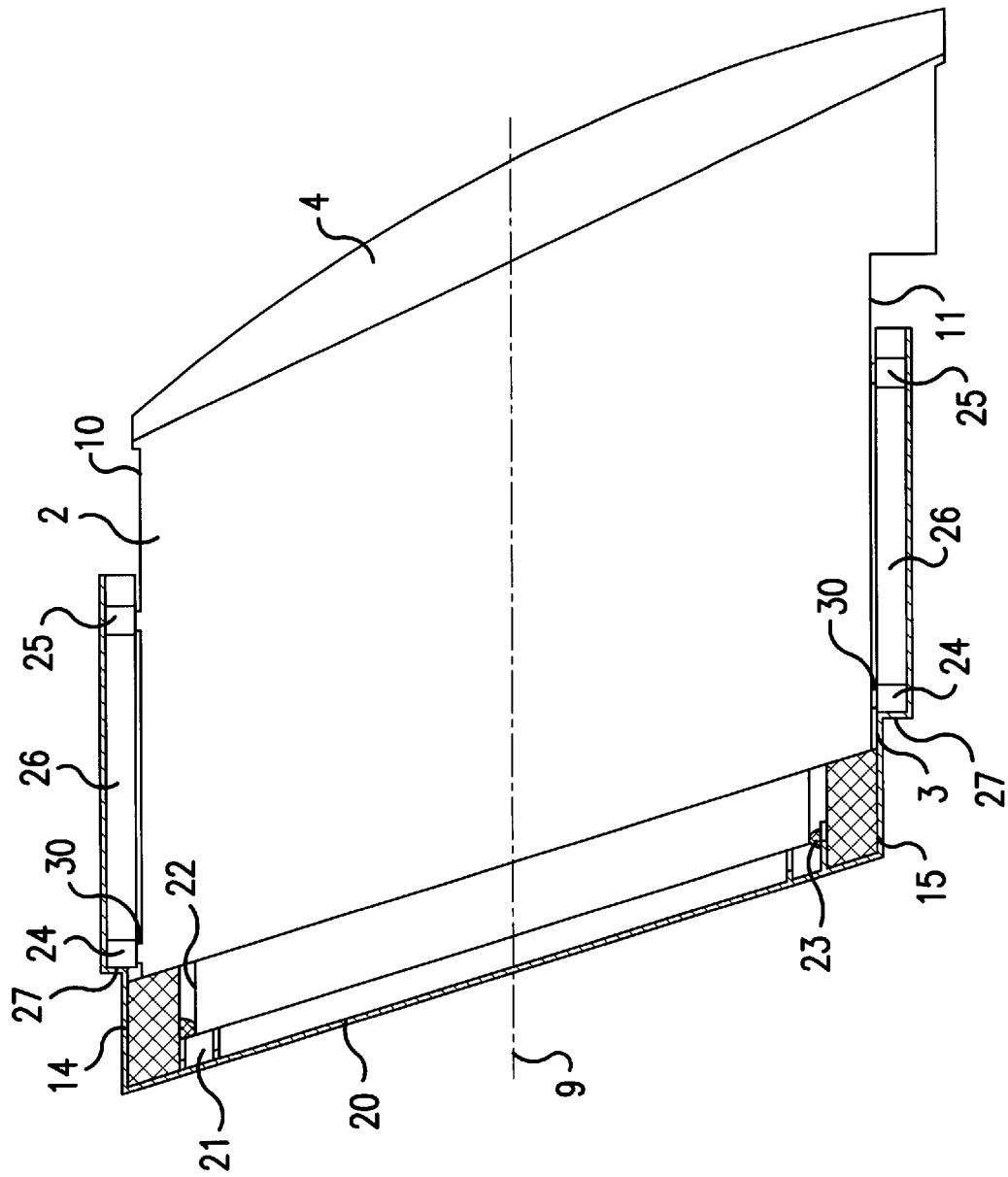
FIG. 2 is a top sectional view of the headlamp of FIG. 1.

A headlamp 1 comprises essentially a headlamp housing 2, a housing receiver 3 and a protective cover 4.

A lamp unit 5 is arranged, for example, in the housing 2. The lamp unit 5 has a reflector 6, into which a lamp 7 is placed from a back side. On an illuminating side an optical screen 8 is arranged between the reflector 6 and the protective cover 4. Lateral to a longitudinal axis 9 the headlamp housing 2 has two sidewalls 10,11 space from one another and extending approximately parallel to one another. Vertically, the sidewalls 10,11 are bounded upwardly by an upper sidewall 12 and downwardly by a lower sidewall 13. In an illuminating direction the headlamp housing 2 is covered or enclosed by the protective cover 4.

The housing receiver 3 can be arranged to be rigidly attached to a not-shown vehicle body part that contains the headlamp 1 and serves, for one thing, as a rear closure of the headlamp housing 2, and, for another thing, as a housing mount. For this purpose the housing receiver 3 has a first receiver wall 14 and a second receiver wall 15, which are arranged adjacent the sidewalls 10,11 of the headlamp housing 2. The receiver walls 14,15 are bounded upwardly by an upper receiver wall 16 and downwardly by a lower receiver wall 17. The upper receiver wall 16 is adjacent to the upper sidewall 12, and the lower receiver wall 17 is adjacent to the lower sidewall 13. In a forward illuminating direction the housing receiver 3 has a receiving aperture 18 that is bounded by the receiver walls 14,15,16,17. On a backside 19 facing away from the receiving aperture 18, the housing receiver 3 is closed by a rear wall 20.

The rear wall 20 has a surrounding slot 21 facing the headlamp housing 2, into which a surrounding edge 22 of the headlamp housing 2, having an elastic gasket 23, can be inserted for forming a seal therewith.

In a horizontal direction, lateral to the longitudinal axis 9 of the headlamp housing 2 on the sidewalls 10,11, are arranged two opposing rear guide lugs, or pins, 24 nearer to the rear wall 20 and two opposing front guide lugs, or pins, 25 nearer to the protective cover 4.

The receiver walls 14,15 adjacent to sidewalls 10,11 have guides 26 that correspond to the guide lugs 24,25.

The headlamp housing is interengageable with, or latched in, the housing receiver 3 by the guide lugs 24,25. In a normal, or rest, position the rear guide lugs 24 contact guide stops 27 adjacent to the rear wall 20. The headlamp housing has a rear wall strip 28 facing the rear wall 20, on which the surrounding edge 22 is arranged.

An energy absorber 29 is arranged between the rear wall strip 28 and the rear wall 20. In its normal or rest position the rear wall strip 28 of the headlamp housing 2 contacts the energy absorber 29. The energy absorber 29 is structured as a foam absorber 29 of a compressible foam material.

The rear guide lugs 24 have a predetermined breaking point 30, at which they shear off when a specific load or impact causes a set force to be exceeded in the direction of the longitudinal axis 9.

The housing receiver 3 has a first electrical contact element 32 on an inner side 31 of the rear wall 20 facing the headlamp housing 2.

A second contact element 33 adjacent to the first contact element 32 is arranged on the headlamp housing 2, that is on a housing backside 34, so that the contact elements 32,33 are connected in electrical contact to one another when the headlamp housing 2 is inserted into housing receiver 3. The first contact element 32 is seated in a clip mount 35 on housing receiver 3 or on the rear wall 20.

For mounting, the headlamp housing 2 is inserted into the housing receiver 3 from the front along the driving direction, so that its guide lugs 24,25 are guided in the guides 26, so that the headlamp housing 2 is latched in a normal position in the housing receiver 3. In the normal position the guide lugs 24,25 are held in a defined latched position. In the event of a crash with a defined impact in the longitudinal direction, when a specific force is exceeded, the headlamp housing 2 is shoved toward the rear wall 20 along a predetermined energy-absorption path in the direction of the longitudinal axis 9. When this happens, at least the rear guide lugs 24 shear off at their predetermined breaking points 30, so that the headlamp housing 2 becomes unlatched and its rear wall strip 28 activates the energy absorber 29, that is, an energy conversion occurs by its plastic deformation.

Figure 3:
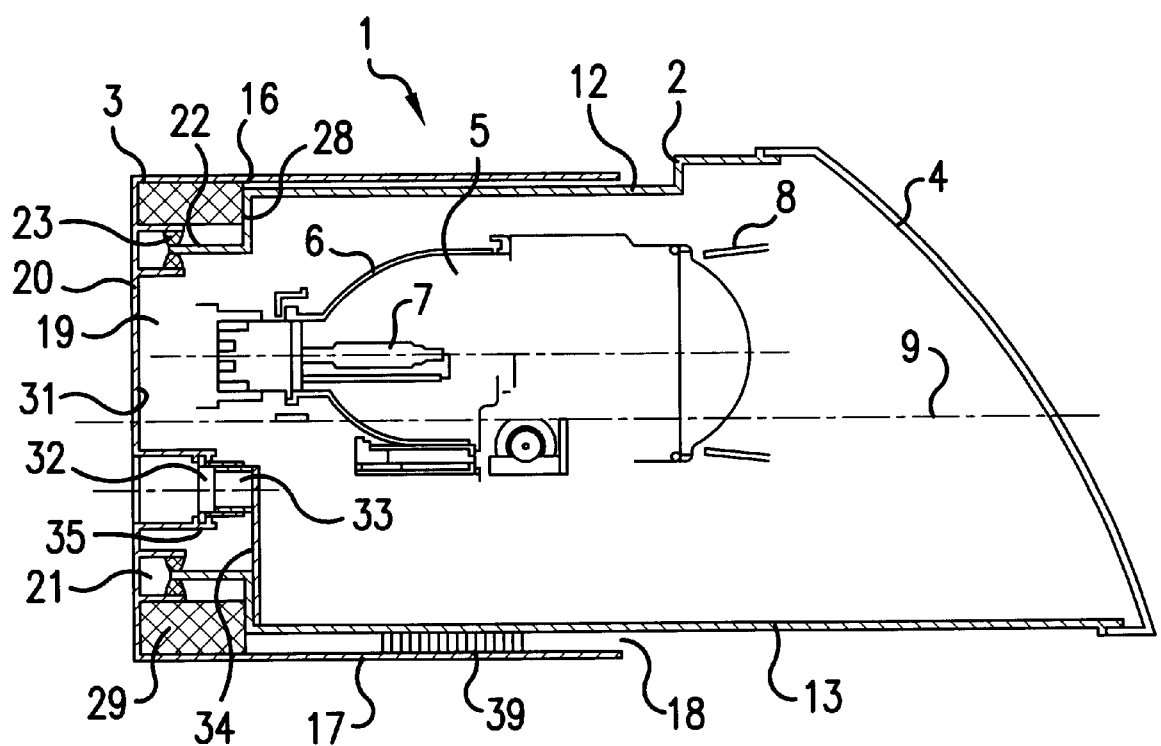
FIG. 3 is a side view of a headlamp for motor vehicles in section according to an alternative embodiment of this invention.

According to an alternative embodiment of the invention shown in FIG. 3, in contrast to the embodiment already described, a lower energy absorber 39 is additionally provided which—in a lower area of the headlamp 1—extends between the lower sidewall 13 of the headlamp housing 2 and the receiver wall 17 of the housing receiver 3. Upon an impact from the front, impact energy is not only absorbed in the direction of the longitudinal axis 9, but also laterally thereto. The lower energy absorber 39 is of the same material as is the rear energy absorber 29. Both may be of an energy absorbing foam material or an energy absorbing mesh plastic.

As an alternative, additional energy absorbers may be arranged on the sidewalls 10,11,12 of the headlamp housing 2, to form a substantially enclosed rear cushioning for the walls 10,11,12,13 of the headlamp housing 2 in this manner.

The energy absorbers form an enclosure for the headlamp housing 2 in a lateral and rear area and can be formed as one piece.

Figure 4:
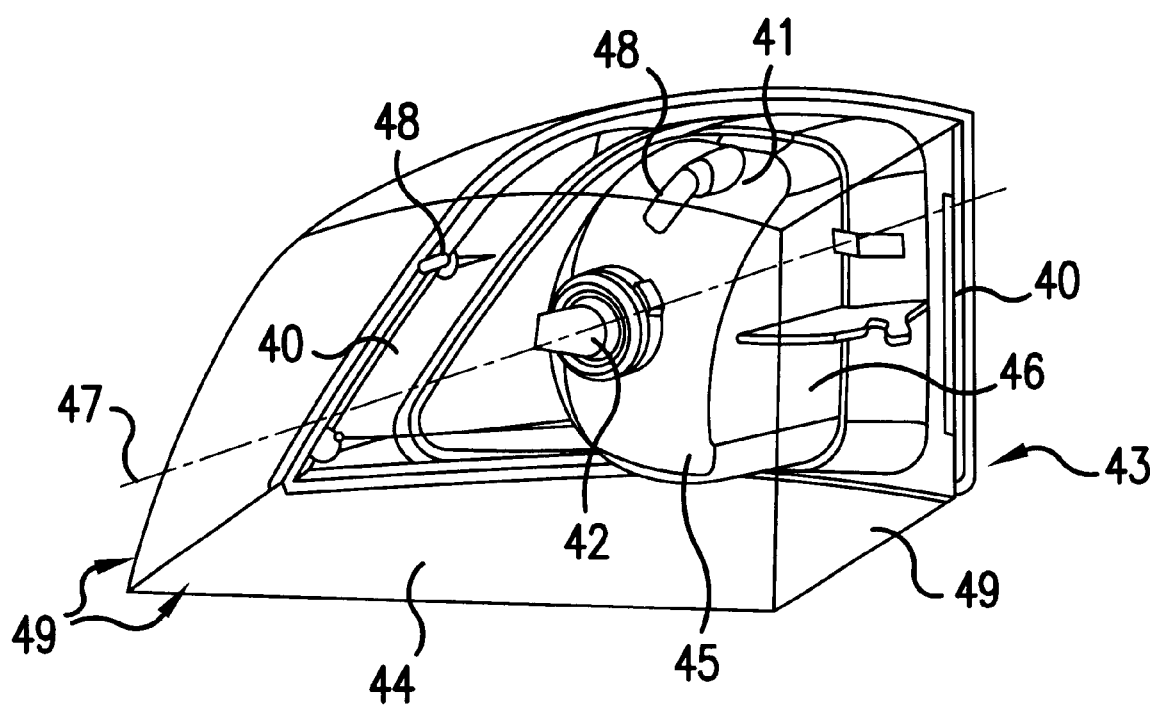
FIG. 4 is a rear perspective view of an energy absorbing block and a headlamp housing of this invention seated in its receiver cavity.

According to another embodiment of the invention shown in FIG. 4 a headlamp housing 40, with a reflector 41 in whose rear-side opening a lamp fixture 42 is attached, is framed in a receiver cradle 43 of a energy absorber 44 that is structured as an energy absorbing block. A contour of the receiver cradle 43 corresponds a rear contour of the headlamp housing 40 and the reflector 41. The reflector 41 can be considered as being a part of the backside or sidewall of the headlamp housing 40, so that a backside 45 and sidewalls 46 that connect to it from the front lie in surface contact with and directly in the receiver cradle 43.

The energy absorbing block 44 has a thickness structured so that, in the event of impact loading from the front at an acute angle to a longitudinal axis, the headlamp housing 40 can be displaced not only in a direction opposite to the driving direction, but also at an acute angle to a longitudinal axis 47 of the headlamp housing 40. The energy absorbing displacement can form a plane with the longitudinal axis 47 that lies at an acute angle, preferably up to 45 degrees to vertical and/or horizontal planes. In this case the headlamp housing 40 is displaced in a direction of an impact force.

As an alternative the energy absorbing block 44 may have several different stiffnesses in different regions, so that the headlamp housing 40 is guided along a predetermined energy absorption path. For example, a lower region that is arranged below the reflector 41 may have a stiff region that becomes narrower in a rearward direction, so that the force is redirected toward the rear in the event of an impact load of the headlamp housing 40 from above. The lower region of the energy absorber block 44 can be of a less stiff material.

Several releasably-attached attachment parts 48 are provided to attach the headlamp housing 40 to corresponding not-shown fixed vehicle parts (body part). Preferably the attachment parts and/or vehicle parts have predetermined breaking points, so that in the event of an impact load the headlamp housing 40 can be displaced in a predetermined direction or in a direction of the impact force. The attachment part 48 is preferably formed as a tear-away, plastic, bottle-shaped part.

The energy absorbing block 44 is supported at its rear walls 49 by surface contact with a not-shown vehicle body supporting frame. The surface-distributed force captured by the energy absorbing block 44 is thereby opposed by a reactive surface-distributed force of the supporting frame on the vehicle body.

The energy absorbing block 44 can be of a plastic mesh or foam. PUR (Polyurethane) or PE (Polyethylene) foams with a hardness of 10 to 200 kJ/m$^3$ could be used, for example.

The invention claimed is:

1. Headlamp, including a headlamp housing which can be inserted into a vehicle body opening from the front generally along a driving direction,
   wherein said headlamp includes an energy absorber for engaging the headlamp housing such that the headlamp housing (2, 40) is displacable along a predetermined energy-absorption path, along which the headlamp housing transfers energy to the energy absorber,
   wherein said headlamp further includes a housing receiver (3) in which the headlamp housing is mounted, and wherein the headlamp housing (2) has guide parts and the housing receiver (3) has guides (26) for guiding: the guide parts, with the guide parts being latched in the guides when the headlamp housing is in a normal position.

2. Headlamp as in claim 1, wherein at least one of a backside (34, 45), facing away from a protective cover (4), and a sidewall (46) of the headlamp housing (2, 40) is releasable to be displaced against the energy absorber (29) along the energy absorption path.

3. Headlamp as in claim 2, wherein the energy absorber is structured as an energy absorbing block (44) that encloses a rear portion of the headlamp housing, and which has a receiving cavity (43) whose contour corresponds to a contour of said rear portion of the headlamp housing (40) and in which said rear portion of the headlamp housing (40) is cradled.

4. Headlamp as in one of the claim 1, wherein the headlamp housing (40) has at least one attachment part (48) in a rear contour area thereof, which releasably attaches to a fixed vehicle part.

5. Headlamp as in claim 3, wherein the energy absorbing block (44) has several regions of different stiffness so that the headlamp housing (40) is guided along a predetermined energy absorption path.

6. Headlamp as in claim 4, wherein one of the attachment part (48) and the vehicle part has a predetermined breaking point so that when an impact force occurs from the front the headlamp housing (40) can be displaced in a direction of the impact force or in a predetermined guide direction.

7. Headlamp as in claim 1, wherein the energy absorber is formed as an energy absorbing block (44) and is supported by surface contact with a supporting frame of the vehicle body.

8. Headlamp as in claim 4, wherein the attachment part (48) is structured as a bottle-shaped plastic part.

9. Headlamp as in claim 1, wherein the guide parts are structured as guide lugs (24, 25) which have a predetermined breaking point (30) so that the guide lugs unlatch the headlamp housing (2) from the housing receiver (3) when the guide lugs are sheared off by a defined impact.

10. Headlamp as in claim 1, wherein another energy absorber (39) is arranged transverse to the longitudinal axis (9) of the headlamp housing (2) between the sidewall (12, 13) of the headlamp housing (2) and a receiving wall (17) of the housing receiver (3).

11. Headlamp as in claim 1, wherein the headlamp housing (2) has an elastic gasket (23) directed toward the housing receiver (3).

12. Headlamp as in claim 1, wherein the headlamp housing (2) has a contact element (33) on its backside (34), which is in conductive contact with a further contact element (32) of the housing receiver (3).

13. Headlamp as in claim 12, wherein,—in the event of a defined impact,—the further contact element (32) is for detaching from its bearing seat (35) and displacing together with the headlamp housing (2) the energy-absorption path.

14. Headlamp as in claim 12, wherein the further contact element (32) is seated in a clip mount (35) arranged on the housing receiver (3).

15. Headlamp as in claim 9, wherein the guide lugs (24, 25) and the energy absorber (29, 44) are structured to be replaceable.

16. Headlamp as in claim 1, wherein the energy absorber (29, 44) is structured as a foam absorber, comprising at least one of compressible foam and a plastic mesh.

17. Headlamp as in claim 16, wherein the energy absorber (29,44) comprises one of a PUR foam material and a PE foam material.

* * * * *